United States Patent
Bhargava et al.

(10) Patent No.: US 12,148,223 B2
(45) Date of Patent: Nov. 19, 2024

(54) SHARED VISION SYSTEM BACKBONE

(71) Applicant: TOYOTA RESEARCH INSTITUTE, INC., Los Altos, CA (US)

(72) Inventors: Arjun Bhargava, San Francisco, CA (US); Chao Fang, Sunnyvale, CA (US); Charles Christopher Ochoa, San Francisco, CA (US); Kun-Hsin Chen, San Francisco, CA (US); Kuan-Hui Lee, Jose, CA (US); Vitor Guizilini, Santa Clara, CA (US)

(73) Assignees: TOYOTA RESEARCH INSTITUTE, INC., Los Altos, CA (US); TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 290 days.

(21) Appl. No.: 17/732,421

(22) Filed: Apr. 28, 2022

(65) Prior Publication Data

US 2023/0351767 A1  Nov. 2, 2023

(51) Int. Cl.
*G06V 20/58* (2022.01)
*B60W 60/00* (2020.01)
*G06V 20/40* (2022.01)

(52) U.S. Cl.
CPC .......... *G06V 20/58* (2022.01); *B60W 60/001* (2020.02); *G06V 20/49* (2022.01); *B60W 2420/403* (2013.01); *B60W 2420/408* (2024.01)

(58) Field of Classification Search
CPC ......... B60W 60/001; B60W 2420/408; B60W 2420/403; G06V 20/49; G06V 10/513;
(Continued)

(56) References Cited

U.S. PATENT DOCUMENTS 10,789,427 B2   9/2020   Shazeer et al.
2017/0371329 A1  12/2017  Giering et al.
(Continued)

OTHER PUBLICATIONS

Guizilini, V., Ambrus, R., Burgard, W., & Gaidon, A. (2021). Sparse auxiliary networks for unified monocular depth prediction and completion. In Proceedings of the ieee/cvf conference on computer vision and pattern recognition (pp. 11078-11088). (Year: 2021).*
(Continued)

*Primary Examiner* — Andrae S Allison
*Assistant Examiner* — Emmanuel Silva-Avina
(74) *Attorney, Agent, or Firm* — Seyfarth Shaw LLP

(57) ABSTRACT

A method for generating a dense light detection and ranging (LiDAR) representation by a vision system includes receiving, at a sparse depth network, one or more sparse representations of an environment. The method also includes generating a depth estimate of the environment depicted in an image captured by an image capturing sensor. The method further includes generating, via the sparse depth network, one or more sparse depth estimates based on receiving the one or more sparse representations. The method also includes fusing the depth estimate and the one or more sparse depth estimates to generate a dense depth estimate. The method further includes generating the dense LiDAR representation based on the dense depth estimate and controlling an action of the vehicle based on identifying a three-dimensional object in the dense LiDAR representation.

20 Claims, 10 Drawing Sheets

(58) Field of Classification Search
CPC ...... G06V 20/70; G06V 20/64; G06V 20/588; G06V 20/58; G06V 20/56; G06V 10/82; G06V 10/806; G06V 10/80; G06V 10/454
USPC ......................................................... 382/104
See application file for complete search history.

(56) References Cited

U.S. PATENT DOCUMENTS

| | | | |
|---|---|---|---|
| 2020/0160559 A1* | 5/2020 | Urtasun | G06V 20/58 |
| 2021/0101624 A1 | 4/2021 | Philbin et al. | |
| 2023/0135088 A1* | 5/2023 | Wang | B60W 40/09 701/23 |

OTHER PUBLICATIONS

Shivakumar, S. S., Nguyen, T., Miller, I. D., Chen, S. W., Kumar, V., & Taylor, C. J. (Oct. 2019). Dfusenet: Deep fusion of rgb and sparse depth information for image guided dense depth completion. In 2019 IEEE Intelligent Transportation Systems Conference (ITSC) (pp. 13-20). IEEE. (Year: 2019).*

Sidhu, et al., "Scalable Primitives for Generalized Sensor Fusion in Autonomous Vehicles", Machine Learning for Autonomous Driving Workshop at the 35th Conference on Neural Information Processing Systems (NeurIPS 2021), Sydney, Australia.

Liang, et al., "Multi-task multi-sensor fusion for 3d object detection." Proceedings of the IEEE/CVF Conference on Computer Vision and Pattern Recognition. 2019.

Wang, et al. "Multi-Modal 3D Object Detection in Autonomous Driving: a Survey", arXiv:2106.12735v2, Jun. 25, 2021.

Goel, et al. "QuadroNet: Multi-Task Learning for Real-Time Semantic Depth Aware Instance Segmentation," 2021 IEEE Winter Conference on Applications of Computer Vision (WACV), 2021, pp. 315-324/.

Guizilini, et al., "3D Packing for Self-Supervised Monocular Depth Estimation", arXiv:1905.02693v4, Mar. 28, 2020.

Guizilini, et al. "Sparse Auxiliary Networks for Unified Monocular Depth Prediction and Completion", arXiv:2103.16609v1v1, Mar. 30, 2021.

* cited by examiner

SHARED VISION SYSTEM BACKBONE

BACKGROUND

Field

Certain aspects of the present disclosure generally relate to a vision system and, more particularly, to a system and method for sharing a vision system backbone for multiple vision-based tasks.

Background

Autonomous agents (e.g., vehicles, robots, etc.) rely on machine vision for constructing a three-dimensional (3D) representation of a surrounding environment. The 3D representation may be used for various tasks, such as localization and/or autonomous navigation. The 3D representation accuracy improves the autonomous agent's ability to perform various tasks. Conventional systems use a light detection and ranging (LiDAR) sensor to generate accurate 3D representations. Although LiDAR sensors may be highly precise, it may be desirable to use alternatives to LiDAR. Some conventional systems use pseudo-LiDAR as an alternative to LiDAR. Still, it may be desirable to improve an accuracy of a 3D representation by using multiple 2D representations of an environment to generate the 3D representation.

SUMMARY

In one aspect of the present disclosure, a method for generating a dense light detection and ranging (LiDAR) map includes receiving, at a sparse depth network, one or more sparse representations of an environment within a vicinity of the vehicle. The method further includes generating, at a depth estimation network, a depth estimate of the environment depicted in an image captured by an image capturing sensor integrated with the vehicle based on receiving the one or more sparse representation. The method still further includes generating, via the sparse depth network, one or more sparse depth estimates based on receiving the one or more sparse representations of the environment, each sparse depth estimate associated with a respective sparse representation of the one or more sparse representations. The method also includes fusing, at a depth fusion network, the depth estimate and the one or more sparse depth estimates to generate a dense depth estimate. The method further includes generating the dense LiDAR representation based on the dense depth estimate. The method still further includes controlling an action of the vehicle based on identifying a three-dimensional object in the dense LiDAR representation.

Another aspect of the present disclosure is directed to an apparatus including means for receiving, at a sparse depth network, one or more sparse representations of an environment within a vicinity of the vehicle. The apparatus further includes means for generating, at a depth estimation network, a depth estimate of the environment depicted in an image captured by an image capturing sensor integrated with the vehicle based on receiving the one or more sparse representation. The apparatus still further includes means for generating, via the sparse depth network, one or more sparse depth estimates based on receiving the one or more sparse representations of the environment, each sparse depth estimate associated with a respective sparse representation of the one or more sparse representations. The apparatus also includes means for fusing, at a depth fusion network, the depth estimate and the one or more sparse depth estimates to generate a dense depth estimate. The apparatus further includes means for generating the dense LiDAR representation based on the dense depth estimate. The apparatus still further includes means for controlling an action of the vehicle based on identifying a three-dimensional object in the dense LiDAR representation.

In another aspect of the present disclosure, a non-transitory computer-readable medium with non-transitory program code recorded thereon is disclosed. The program code is executed by a processor and includes program code to receive, at a sparse depth network, one or more sparse representations of an environment within a vicinity of the vehicle. The program code further includes program code to generate, at a depth estimation network, a depth estimate of the environment depicted in an image captured by an image capturing sensor integrated with the vehicle based on receiving the one or more sparse representation. The program code still further includes program code to generate, via the sparse depth network, one or more sparse depth estimates based on receiving the one or more sparse representations of the environment, each sparse depth estimate associated with a respective sparse representation of the one or more sparse representations. The program code also includes program code to <<FUSING>>, at a depth fusion network, the depth estimate and the one or more sparse depth estimates to generate a dense depth estimate. The program code further includes program code to generate the dense LiDAR representation based on the dense depth estimate. The program code still further includes program code to control an action of the vehicle based on identifying a three-dimensional object in the dense LiDAR representation.

Another aspect of the present disclosure is directed to an apparatus having processor, and a memory coupled with the processor and storing instructions operable, when executed by the processor, to cause the apparatus to receive, at a sparse depth network, one or more sparse representations of an environment within a vicinity of the vehicle. Execution of the instructions also cause the apparatus to generate, at a depth estimation network, a depth estimate of the environment depicted in an image captured by an image capturing sensor integrated with the vehicle based on receiving the one or more sparse representation. Execution of the instructions further cause the apparatus to generate, via the sparse depth network, one or more sparse depth estimates based on receiving the one or more sparse representations of the environment, each sparse depth estimate associated with a respective sparse representation of the one or more sparse representations. Execution of the instructions still further cause the apparatus to fuse, at a depth fusion network, the depth estimate and the one or more sparse depth estimates to generate a dense depth estimate. Execution of the instructions also cause the apparatus to generate the dense LiDAR representation based on the dense depth estimate. Execution of the instructions further cause the apparatus to control an action of the vehicle based on identifying a three-dimensional object in the dense LiDAR representation.

This has outlined, rather broadly, the features and technical advantages of the present disclosure in order that the detailed description that follows may be better understood. Additional features and advantages of the present disclosure will be described below. It should be appreciated by those skilled in the art that this present disclosure may be readily utilized as a basis for modifying or designing other structures for carrying out the same purposes of the present disclosure. It should also be realized by those skilled in the art that such equivalent constructions do not depart from the teachings of the present disclosure as set forth in the appended claims. The novel features, which are believed to be characteristic of the present disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Figure 1A:
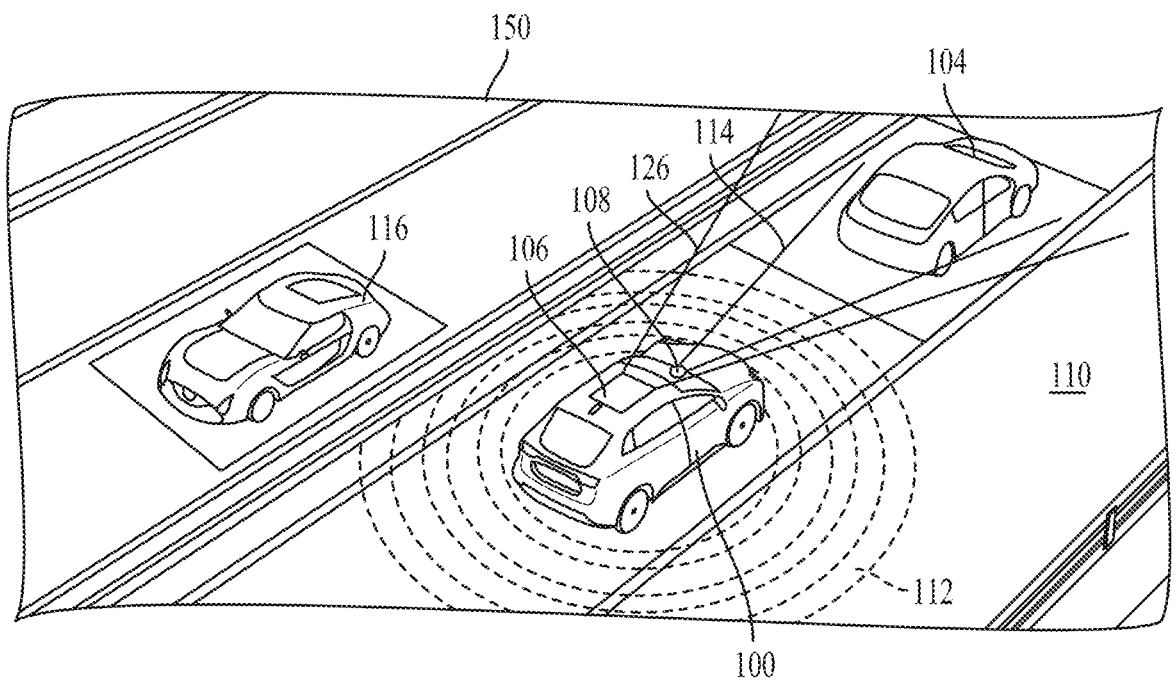
FIGS. 1A and 1B are diagrams illustrating examples of a vehicle, in accordance with various aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. It will be apparent to those skilled in the art, however, that these concepts may be practiced without these specific details. In some instances, well-known structures and components are shown in block diagram form in order to avoid obscuring such concepts.

Based on the teachings, one skilled in the art should appreciate that the scope of the present disclosure is intended to cover any aspect of the present disclosure, whether implemented independently of or combined with any other aspect of the present disclosure. For example, an apparatus may be implemented or a method may be practiced using any number of the aspects set forth. In addition, the scope of the present disclosure is intended to cover such an apparatus or method practiced using other structure, functionality, or structure and functionality in addition to, or other than the various aspects of the present disclosure set forth. It should be understood that any aspect of the present disclosure may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the present disclosure. Although some benefits and advantages of the preferred aspects are mentioned, the scope of the present disclosure is not intended to be limited to particular benefits, uses or objectives. Rather, aspects of the present disclosure are intended to be broadly applicable to different technologies, system configurations, networks and protocols, some of which are illustrated by way of example in the figures and in the following description of the preferred aspects. The detailed description and drawings are merely illustrative of the present disclosure rather than limiting, the scope of the present disclosure being defined by the appended claims and equivalents thereof.

Autonomous agents (e.g., vehicles, robots, etc.) rely on machine vision for constructing a three-dimensional (3D) representation of a surrounding environment. The 3D representation may be used for various tasks, such as localization and/or autonomous navigation. The 3D representation accuracy improves the autonomous agent's ability to perform various tasks. Conventional systems use a light detection and ranging (LiDAR) sensor to generate accurate 3D representations.

A LIDAR sensor emits beams into an environment and receives beams that are reflected by one or more objects in the environment. The time of return of the reflected beams enable detection of a depth of objects in the environment. In some examples, the result of the reflected beams is a point cloud representing the objects.

This point cloud may be used by an object detection function, such as a classifier neural network, to detect the types of objects found in the point cloud data. In some cases, the point cloud, which is 3D, may be converted to a "bird's eye view map" by projecting the three dimensional data onto a two dimensional plane. This bird's eye view map is then input into the object detection function to detect objects in the environment.

Although LiDAR works well in automotive applications, it may be desirable to use alternatives to LiDAR for generating 3D representations (e.g., a 3D map) of an environment. For example, LiDAR may be expensive and may increase costs associated with autonomous driving hardware. Additionally, LiDAR may encounter errors in certain weather conditions, such as rain or fog. Therefore, reliance on a single sensor may decrease vehicle safety. Some conventional systems, use pseudo-LiDAR as an alternative to LiDAR. In such systems, a pseudo-LiDAR point cloud may be, may be used to generate a 3D map of an environment.

As an example, in some conventional systems, 3D Point cloud data, similar to LiDAR point cloud data, can be extracted from an intermediate depth estimation taken from image data (e.g., 2D image data). Such point cloud data may be referred to as pseudo-LiDAR because the point cloud data resembles LiDAR point cloud data. Pseudo-LiDAR data may be input into an object detection functions to detect objects within the environment as represented by the pseudo-LiDAR. However, pseudo-LiDAR produces less accurate object detection results in comparison to LiDAR data obtained from a LiDAR sensor. For example, aberrations and distortions may be created when the image data is transformed into pseudo-LiDAR and a bird's eye view map. Thus, it may be desirable to improve an accuracy of a 3D representation by using multiple 2D representations of an environment to generate the 3D representation.

Various aspects of the present disclosure are directed to a multi-modal architecture that may be used to generate a representation, such as a dense LiDAR representation, from multiple representations. In such aspects, the multiple representations may be generated by two or more different sensors. Furthermore, the architecture may be robust to accommodate different sensor configuration.

In some aspects, multiple 2D representations of an environment may be used to generate a dense LiDAR representation of the environment. The 2D representations may include, for example, an RGB image and one or more of a semantic map, a radar image, or a sparse LiDAR image. The RGB image may be combined with one or more of the semantic map, the radar representation, or the sparse LiDAR representation to generate a dense LiDAR representation (e.g., dense LiDAR map). In some examples, a sparse LiDAR representation may be generated with fewer beams in comparison to a number of beams used to generate the dense LiDAR representation. In some such examples, the sparse LiDAR is generated based on eight beams and the dense LiDAR is generated from more than eight beams. Each image or map may be generated by a different sensor. It may be desirable to use a unified backbone that may be shared between different sensor combinations.

FIG. 1A is a diagram illustrating an example of a vehicle 100 in an environment 150, in accordance with various aspects of the present disclosure. In the example of FIG. 1A, the vehicle 100 may be an autonomous vehicle, a semi-autonomous vehicle, or a non-autonomous vehicle. As shown in FIG. 1A, the vehicle 100 may be traveling on a road 110. A first vehicle 104 may be ahead of the vehicle 100 and a second vehicle 116 may be adjacent to the ego vehicle 100. In this example, the vehicle 100 may include a 2D camera 108, such as a 2D red-green-blue (RGB) camera, and a LiDAR sensor 106. Other sensors, such as radar and/or ultrasound, are also contemplated. Additionally, or alternatively, although not shown in FIG. 1A, the vehicle 100 may include one or more additional sensors, such as a camera, a radar sensor, and/or a LiDAR sensor, integrated with the vehicle in one or more locations, such as within one or more storage locations (e.g., a trunk). Additionally, or alternatively, although not shown in FIG. 1A, the vehicle 100 may include one or more force measuring sensors.

In one configuration, the 2D camera 108 captures a 2D image that includes objects in the 2D camera's 108 field of view 114. The LiDAR sensor 106 may generate one or more output streams. The first output stream may include a 3D cloud point of objects in a first field of view, such as a 360° field of view 112 (e.g., bird's eye view). The second output stream 124 may include a 3D cloud point of objects in a second field of view, such as a forward facing field of view.

The 2D image captured by the 2D camera includes a 2D image of the first vehicle 104, as the first vehicle 104 is in the 2D camera's 108 field of view 114. As is known to those of skill in the art, a LiDAR sensor 106 uses laser light to sense the shape, size, and position of objects in an environment. The LiDAR sensor 106 may vertically and horizontally scan the environment. In the current example, the artificial neural network (e.g., autonomous driving system) of the vehicle 100 may extract height and/or depth features from the first output stream. In some examples, an autonomous driving system of the vehicle 100 may also extract height and/or depth features from the second output stream.

The information obtained from the sensors 106, 108 may be used to evaluate a driving environment. In some examples, the information obtained from the sensors 106, 108 may identify whether the vehicle 100 is at an interaction or a crosswalk. Additionally, or alternatively, the information obtained from the sensors 106, 108 may identify whether one or more dynamic objects, such as pedestrians, are near the vehicle 100.

Figure 1B:
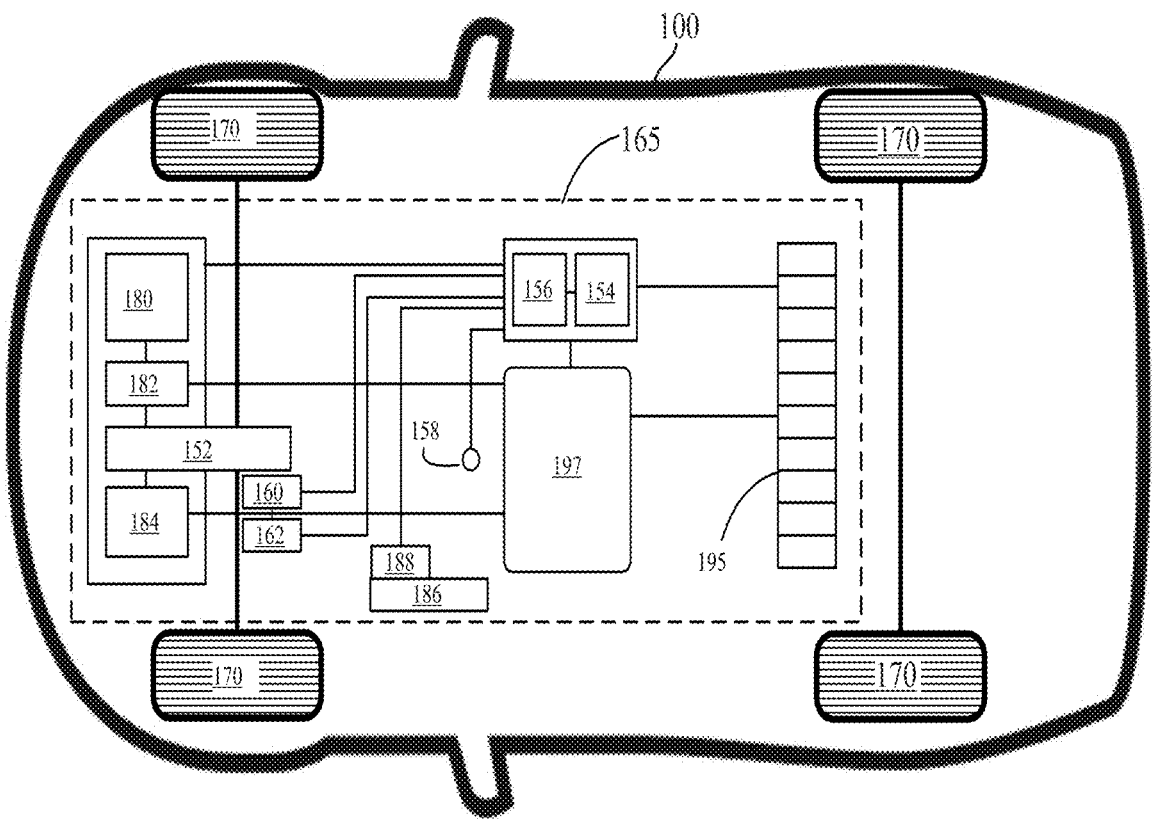

FIG. 1B is a diagram illustrating an example the vehicle 100 in which various aspects of the present disclosure may be implemented. It should be understood that various aspects of the present disclosure may be directed to an autonomous vehicle. The autonomous vehicle may include be an internal combustion engine (ICE) vehicle, fully electric vehicle (EVs), or another type of vehicle. The vehicle 100 may include drive force unit 165 and wheels 170. The drive force unit 165 may include an engine 180, motor generators (MGs) 182 and 184, a battery 195, an inverter 197, a brake pedal 186, a brake pedal sensor 188, a transmission 152, a memory 154, an electronic control unit (ECU) 156, a shifter 158, a speed sensor 160, and an accelerometer 162.

The engine 180 primarily drives the wheels 170. The engine 180 can be an ICE that combusts fuel, such as gasoline, ethanol, diesel, biofuel, or other types of fuels which are suitable for combustion. The torque output by the engine 180 is received by the transmission 152. MGs 182 and 184 can also output torque to the transmission 152. The engine 180 and MGs 182 and 184 may be coupled through a planetary gear (not shown in FIG. 1B). The transmission 152 delivers an applied torque to one or more of the wheels 170. The torque output by engine 180 does not directly translate into the applied torque to the one or more wheels 170.

MGs 182 and 184 can serve as motors which output torque in a drive mode, and can serve as generators to recharge the battery 195 in a regeneration mode. The electric power delivered from or to MGs 182 and 184 passes through the inverter 197 to the battery 195. The brake pedal sensor 188 can detect pressure applied to brake pedal 186, which may further affect the applied torque to wheels 170. The speed sensor 160 is connected to an output shaft of transmission 152 to detect a speed input which is converted into a vehicle speed by ECU 156. The accelerometer 162 is connected to the body of vehicle 100 to detect the actual deceleration of vehicle 100, which corresponds to a deceleration torque.

The transmission 152 may be a transmission suitable for any vehicle. For example, transmission 152 can be an electronically controlled continuously variable transmission (ECVT), which is coupled to engine 180 as well as to MGs 91 and 92. Transmission 20 can deliver torque output from a combination of engine 180 and MGs 91 and 92. The ECU 156 controls the transmission 152, utilizing data stored in memory 154 to determine the applied torque delivered to the wheels 170. For example, ECU 156 may determine that at a certain vehicle speed, engine 180 should provide a fraction of the applied torque to the wheels 170 while one or both of the MGs 182 and 184 provide most of the applied torque.

The ECU 156 and transmission 152 can control an engine speed (NE) of engine 180 independently of the vehicle speed (V).

The ECU 156 may include circuitry to control the above aspects of vehicle operation. Additionally, the ECU 156 may include, for example, a microcomputer that includes a one or more processing units (e.g., microprocessors), memory storage (e.g., RAM, ROM, etc.), and I/O devices. The ECU 156 may execute instructions stored in memory to control one or more electrical systems or subsystems in the vehicle. Furthermore, the ECU 156 can include one or more electronic control units such as, for example, an electronic engine control module, a powertrain control module, a transmission control module, a suspension control module, a body control module, and so on. As a further example, electronic control units may control one or more systems and functions such as doors and door locking, lighting, human-machine interfaces, cruise control, telematics, braking systems (e.g., anti-lock braking system (ABS) or electronic stability control (ESC)), or battery management systems, for example. These various control units can be implemented using two or more separate electronic control units, or a single electronic control unit.

The MGs 182 and 184 each may be a permanent magnet type synchronous motor including for example, a rotor with a permanent magnet embedded therein. The MGs 182 and 184 may each be driven by an inverter controlled by a control signal from ECU 156 so as to convert direct current (DC) power from the battery 195 to alternating current (AC) power, and supply the AC power to the MGs 182 and 184. In some examples, a first MG 182 may be driven by electric power generated by a second MG 184. It should be understood that in embodiments where MGs 182 and 184 are DC motors, no inverter is required. The inverter, in conjunction with a converter assembly may also accept power from one or more of the MGs 182 and 184 (e.g., during engine charging), convert this power from AC back to DC, and use this power to charge battery 195 (hence the name, motor generator). The ECU 156 may control the inverter, adjust driving current supplied to the first MG 182, and adjust the current received from the second MG 184 during regenerative coasting and braking.

The battery 195 may be implemented as one or more batteries or other power storage devices including, for example, lead-acid batteries, lithium ion, and nickel batteries, capacitive storage devices, and so on. The battery 195 may also be charged by one or more of the MGs 182 and 184, such as, for example, by regenerative braking or by coasting during which one or more of the MGs 182 and 184 operates as generator. Alternatively (or additionally, the battery 195 can be charged by the first MG 182, for example, when vehicle 100 is in idle (not moving/not in drive). Further still, the battery 195 may be charged by a battery charger (not shown) that receives energy from engine 180. The battery charger may be switched or otherwise controlled to engage/disengage it with battery 195. For example, an alternator or generator may be coupled directly or indirectly to a drive shaft of engine 180 to generate an electrical current as a result of the operation of engine 180. Still other embodiments contemplate the use of one or more additional motor generators to power the rear wheels of the vehicle 100 (e.g., in vehicles equipped with 4-Wheel Drive), or using two rear motor generators, each powering a rear wheel.

The battery 195 may also power other electrical or electronic systems in the vehicle 100. In some examples, the battery 195 can include, for example, one or more batteries, capacitive storage units, or other storage reservoirs suitable for storing electrical energy that can be used to power one or both of the MGs 182 and 184. When the battery 195 is implemented using one or more batteries, the batteries can include, for example, nickel metal hydride batteries, lithium ion batteries, lead acid batteries, nickel cadmium batteries, lithium ion polymer batteries, or other types of batteries.

The vehicle 100 may operate in one of an autonomous mode, a manual mode or a semi-autonomous mode. In the manual mode, a human driver manually operates (e.g., controls) the vehicle 100. In the autonomous mode, an autonomous control system (e.g., autonomous driving system) operates the vehicle 100 without human intervention. In the semi-autonomous mode, the human may operate the vehicle 100, and the autonomous control system may override or assist the human. For example, the autonomous control system may override the human to prevent a collision or to obey one or more traffic rules.

Aspects of the present disclosure are not limited to the sensors 106, 108 shown in the example of FIG. 1A, different combinations of sensors may be used for a robust and tunable perception pipeline. As an example, in a first combination, the vehicle 100 may include a forward radar, a forward camera, and a rear camera. In a second combination, the vehicle 100 may include the sensors of the first combination, in addition to rear sideward radar and front sonar. In a third combination, the vehicle 100 may include the sensors of the first and/or second combinations, in addition to a front sideward radar and a driver monitoring system (DMS) camera. A fourth combination may include the sensors of the first, second, and/or third combinations, in addition to a telephoto camera and/or a panoramic camera. A fifth combination of sensors may include the sensors of the first, second, third, or fourth combinations in addition to a LiDAR sensor. The combinations of sensors may be an example of dialable perception.

As discussed, machine learning models may be used by one or more sensors to perform vision-based tasks, such as object detection and semantic segmentation. In a dialable perception system, machine learning models may be designed to accommodate the different sensor combinations. Various aspects of the present disclosure are directed to a robust machine learning model architecture that accommodates different sensor combinations.

Figure 2A:
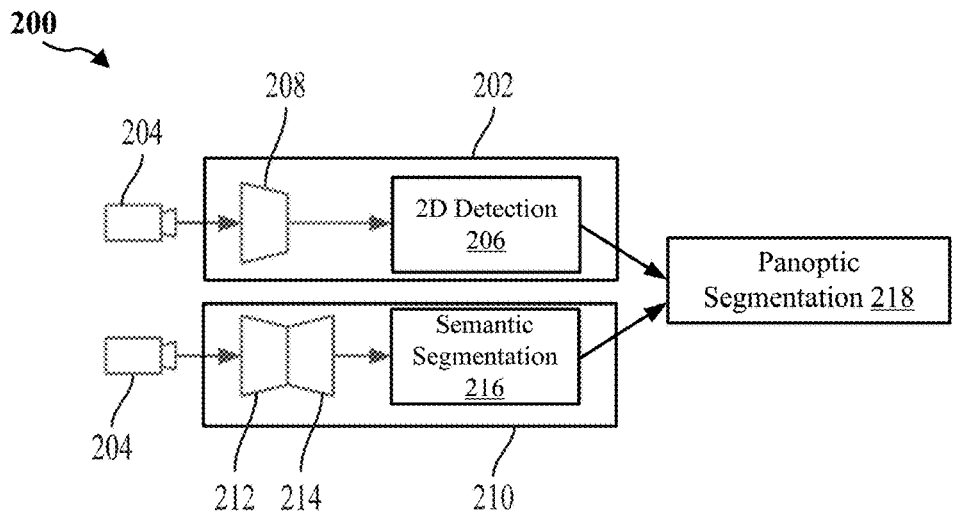
FIG. 2A is a block diagram illustrating an example of an architecture of a conventional panoptic segmentation network.

Some perception tasks have a natural overlap in backbone architecture and representational needs. A panoptic segmentation network is an example of a network that is configured to perform a perception tasks via two networks that have a natural overlap in backbone architecture. Perception networks that share a backbone architecture between networks may also be referred to as multitask networks. An example of a naturally overlapping backbone architecture is shown in FIG. 2A, which is a block diagram illustrating an example of an architecture of a conventional panoptic segmentation network 200. Panoptic segmentation is a combination of instance segmentation and semantic segmentation. In the example of FIG. 2A, a panoptic segmentation network 200 includes an instance segmentation network 202 and a semantic segmentation network 210. The instance segmentation network 202 uses a convolutional neural network (CNN) encoder 208 to receive an image from a sensor 204, such as an RGB camera, and generate a representation that may be used at a 2D detection block 206 to detect an instance of an object in the image.

Additionally, as shown in FIG. 2A, a semantic segmentation network 210 includes a CNN encoder 212 and a CNN decoder 214. The semantic segmentation network 210 may receive an image from the sensor 204 and generate an output, such as labels, based on the input. The output may be received at a semantic segmentation block 216 that generates a semantic map based on the image and the output of the decoder 214. The semantic map generated by the semantic segmentation block 216 and the instance detection from the 2D detection block 206 may be used by a panoptic segmentation block 218 to generate a panoptic segmentation map.

Figure 2B:
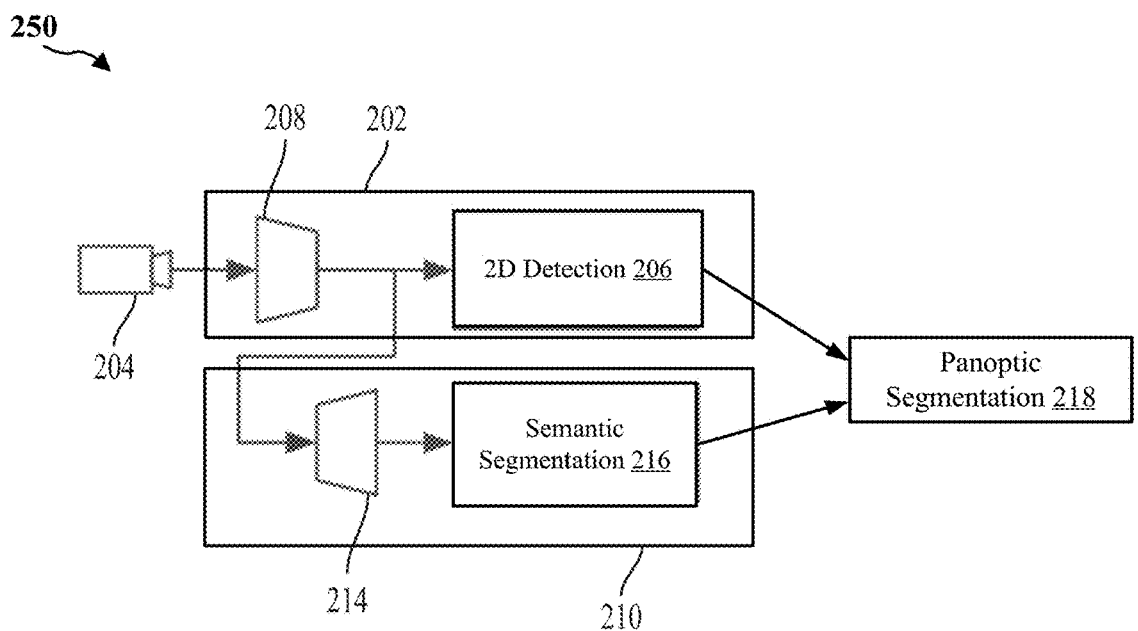
FIG. 2B is a block diagram illustrating an example of sharing a network architecture in a multitask network, in accordance with aspects of the present disclosure.

In the example of FIG. 2A, the semantic segmentation network 210 and the instance segmentation network 202 both use a CNN encoder 208, 212. Therefore, the CNN encoder 208, 212 may be shared between the networks 202, 210. FIG. 2B is a block diagram illustrating an example of sharing a network architecture in a multitask network 250, in accordance with aspects of the present disclosure. In the example of FIG. 2B, the multitask network 250 is an example of a panoptic network. As shown in FIG. 2B, the instance segmentation network 202 and the semantic segmentation network 210 may share the encoder 208. In this example, the encoder 208 may generate a representation of an image received from the sensor 204. The representation may be processed by the 2D detection block 206 and also the decoder 214. The 2D detection block 206 may detect an instance of an object in the image. The decoder 214 may generate labels based on the representation and output the labels to the semantic segmentation block 216 that generates a semantic map based on the image and the output of the decoder 214. The semantic map generated by the semantic segmentation block 216 and the instance detection from the 2D detection block 206 may be used by the panoptic segmentation block 218 to generate a panoptic segmentation map.

In the example of FIG. 2B, sharing the encoder 208 (e.g., a backbone) may improve the representations generated by the encoder 208 because more information is input to the encoder 208 during training. Additionally, a speed associated with the multitask network 250 may improve because only a single forward pass through the backbone is needed, rather than two single forward passes.

As discussed, a speed and accuracy of a multitask network may be improved by sharing an architectural backbone between networks associated with the multitask network. In some examples, the accuracy and/or speed of the multitask network may also be improved by using strong priors obtained from the known physics of the world.

Such priors are not available in a single task regime. As an example, 2D perception and 3D perception are examples of architecturally different tasks. Still, both tasks may be jointly trained if the tasks are regularized based on specifying a consistency between the physical worlds implied by each task.

As discussed above, a vision system may estimate a depth of an environment from one or more images, such as RGB images, captured by an image sensor. In some examples, 3D point cloud data may be extracted from the depth estimates. The 3D point cloud data may be referred to as pseudo-LiDAR data or a pseudo-LiDAR point cloud representation. The pseudo-LiDAR point cloud representation may be used for vision tasks, such as object detection.

In some conventional systems, a process for detecting an object using pseudo-LiDAR may begin by receiving image data from one or more image sensors. The one or more image sensors may be RGB or RGB-D image sensors. In some examples, the depth of the one or more images is not measured. Rather, the per-pixel depth of the objects represented by the image data may be estimated. For example, monocular depth regression may be used to estimate the per-pixel depth. The pseudo-LiDAR point cloud data may be generated using the image data and/or the depth estimates.

As discussed, pseudo-LiDAR is less accurate than LiDAR (e.g., dense LiDAR). Therefore, it may be desirable to improve an accuracy of vision tasks by using a 3D representation generated via LiDAR. Still, as discussed, the use of a LiDAR sensor may be costly. Additionally, LiDAR sensors may not function in certain conditions. Therefore, in some aspects, a dense LiDAR representation may be generated based on scene representations generated by data obtained via one or more sensors.

Figure 3A:
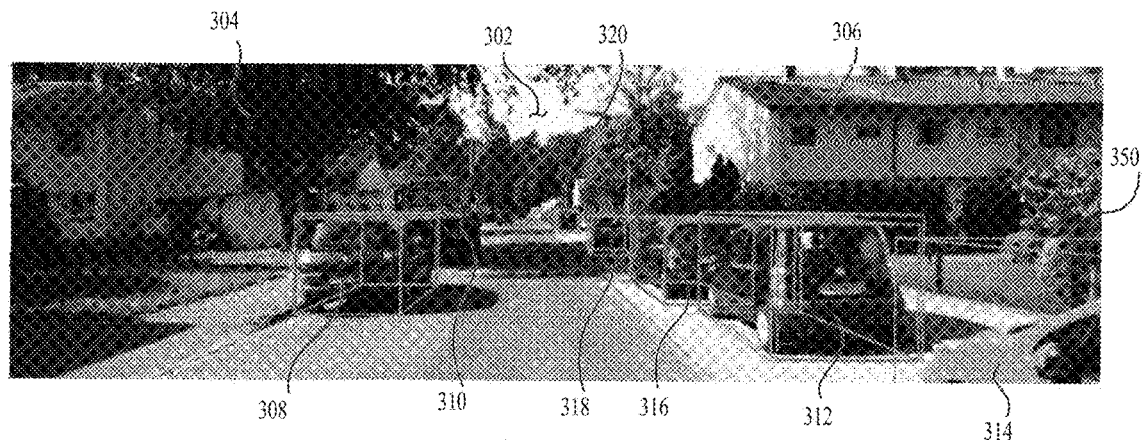
FIG. 3A illustrates an example of an image of a scene captured via a sensor, in accordance with various aspects of the present disclosure

According to various aspects of the present disclosure, a depth map may be generated based on information captured by one or more sensors, such as a camera. FIG. 3A illustrates an example of an image 300 of a scene 302 captured via a sensor, in accordance with various aspects of the present disclosure. In the example of FIG. 3A, the image 300 is a monocular image captured by a monocular camera. However, it should be understood that the image 300 may be a pair of stereo images captured by a stereo camera. The scene 302 includes several objects, including a tree 304, a building 306, and vehicles 308-320.

Figure 3B:
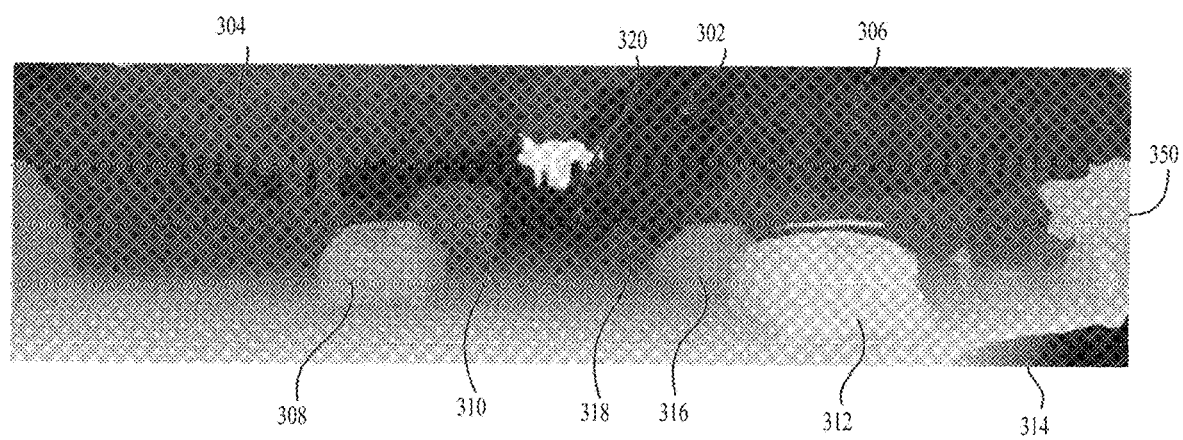
FIG. 3B illustrates an example of a depth map of a scene, in accordance with various aspects of the present disclosure

FIG. 3B illustrates an example of a depth map 350 of a scene 402, in accordance with various aspects of the present disclosure. The depth map 350 corresponds to the image 300 of the scene 302. The depth map 350 may be an image comprising a plurality of pixels. Each pixel has a depth value associated. As such, the depth values for pixels of the depth map 350 represent the distance from a viewpoint, such as the camera(s) to the surface of any objects located within the depth map 350. The depth map 350 includes objects 304, 308, 312, 316, 318, 320, which correspond to the objects 304, 308, 312, 316, 318, 320 of FIG. 3A. In the example of FIG. 3B, the vehicle 312 generally includes pixel values indicating that the surfaces of the vehicle 312 are closer to the viewpoint of the camera(s) than the vehicle 316.

In some examples, a vision system, or a component of the vision system, may generate a point cloud based on a depth map. Generation of the point cloud may occur by back projecting the depth map 350 into a three-dimensional space. A point cloud may include a group of points corresponding to one or more pixels of the depth map. Each point may have three-dimensional location information within a three-dimensional space. Because the point cloud is based on an image captured by a camera instead of data collected from a LiDAR sensor, the point cloud may be referred to as a pseudo-LiDAR point cloud.

Figure 3C:
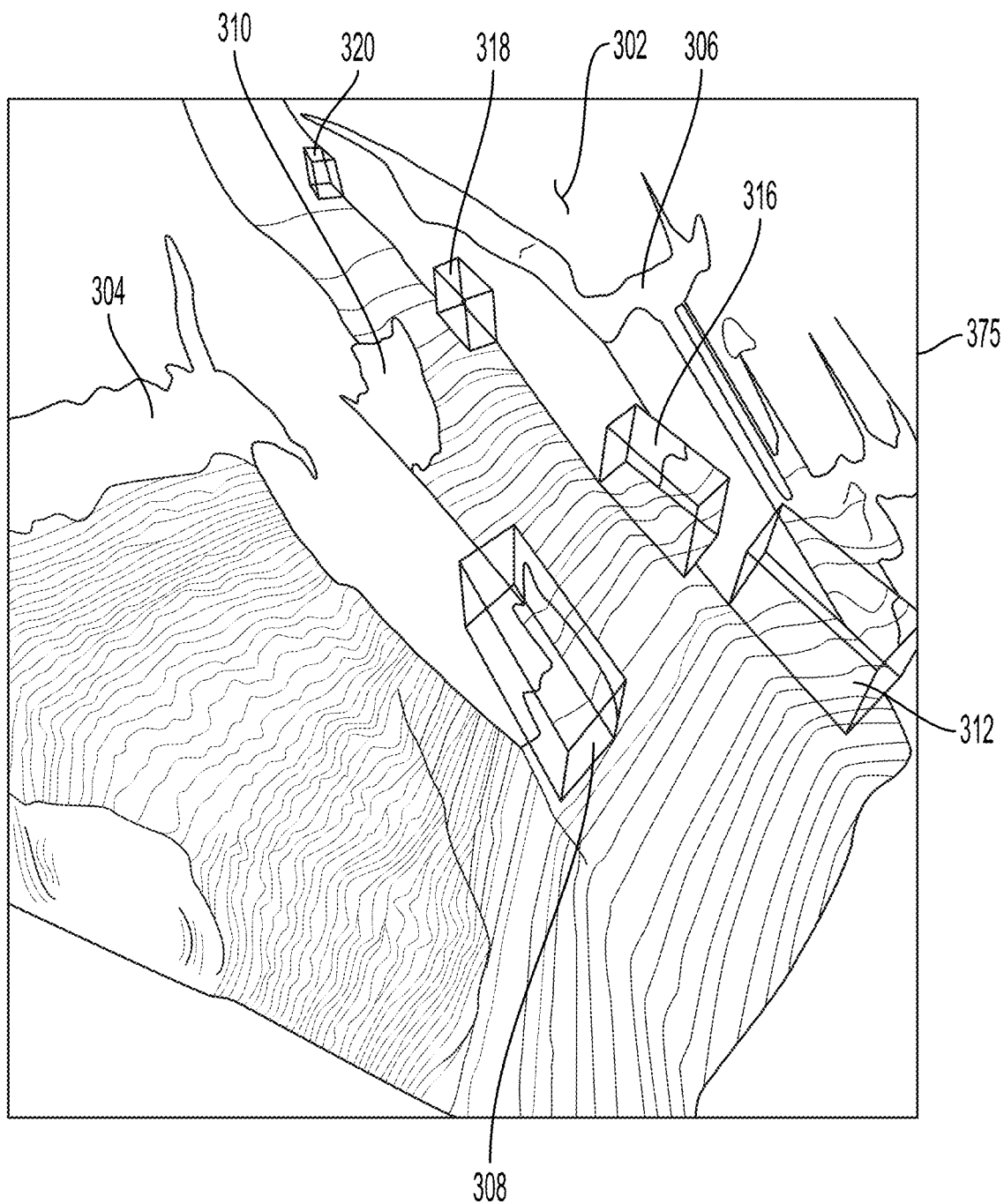
FIG. 3C illustrates an example of a point cloud of a scene, in accordance with various aspects of the present disclosure.

FIG. 3C illustrates an example of a point cloud 375 of a scene 302, in accordance with various aspects of the present disclosure. The point cloud 375 is based on the depth map 350 of the scene 302. The point cloud 375 includes objects 304, 308, 312, 316, 318, 320, which correspond to the objects 304, 308, 312, 316, 318, 320 of FIGS. 3A and 3B. Bounding boxes have been placed around the objects 308, 312, 316, 318, 320 to illustrate the location of these objects. The points of the point cloud 375 indicate the location, in a three-dimensional space, of the surface of objects within the scene 302.

Figure 3D:
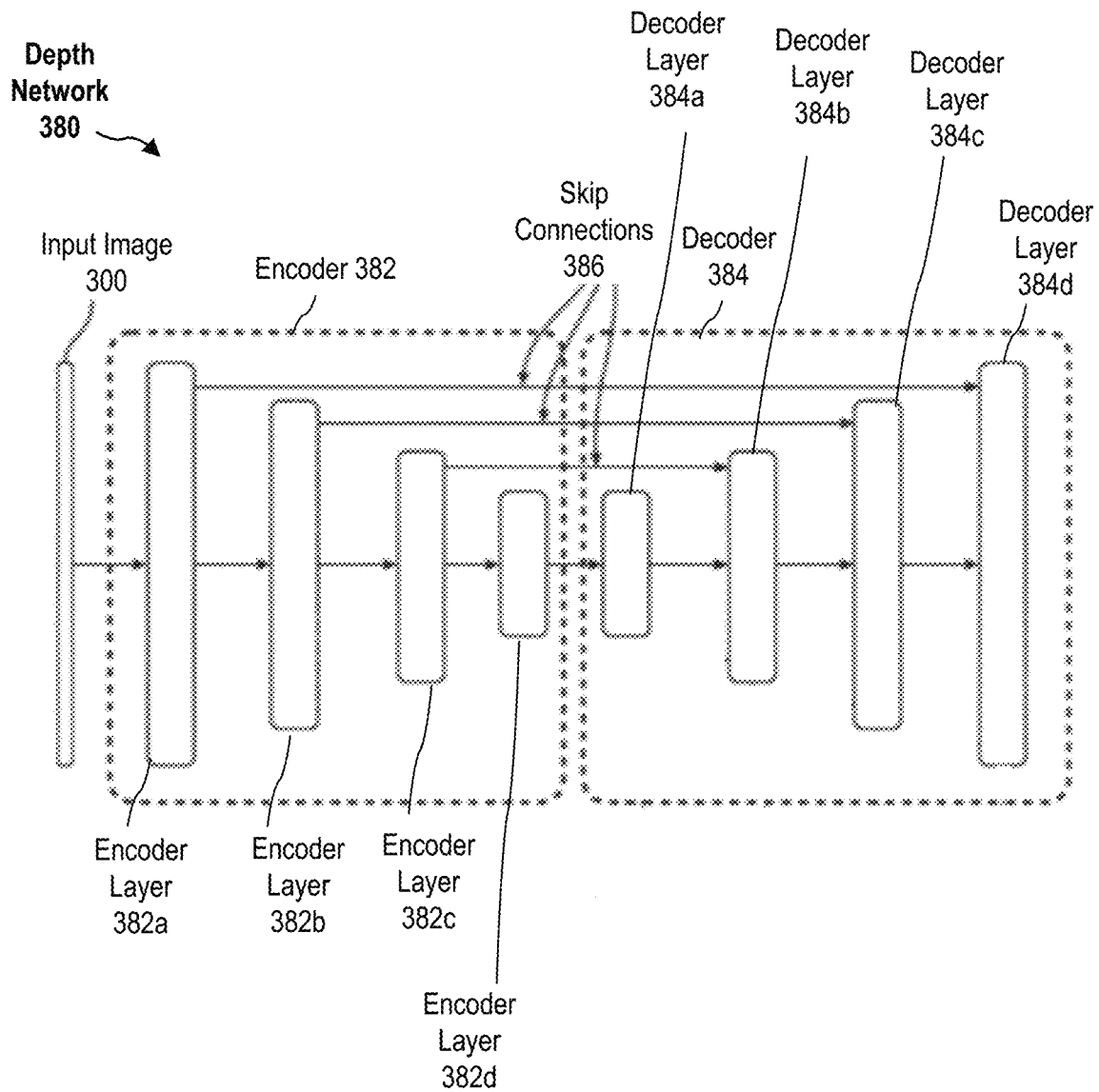
FIG. 3D illustrates an example of a depth network, in accordance with various aspects of the present disclosure.

In some examples, the depth map 350 may be generated by a depth estimation network, such as the depth network 380 (e.g., depth estimation network) described in FIG. 3D, in accordance with various aspects of the present disclosure.

As shown in FIG. 3D, the depth network 380 includes an encoder 382 and a decoder 384. The depth network 380 generates a per-pixel depth map, such as the depth map 350 of FIG. 3B, of an input image 300. In some examples, a 2D image may implicitly provide depth information in the relationships of perspective and size of elements depicted in the image from which the depth network 380 derives the depth map 350. The depth map 350 is, in some embodiments, a data structure corresponding to the image 300 that indicates distances (e.g., depths) to objects represented therein.

The encoder 382 includes multiple encoder layers 382 a-d. Each encoder layer 382 a-d may be a packing layer for downsampling features during the encoding process. Specifically, the encoder 382 receives the image 300 as an electronic input and processes the image 300 to extract features from the image 300. The features are, in general, aspects of the image 300 that are indicative of spatial information that is intrinsically encoded therein. As such, encoder layers 382 a-d may fold (e.g., adapt dimensions of the feature map to retain the features) encoded features into separate channels, iteratively reducing spatial dimensions of the image while packing additional channels with information about embedded states of the features. Thus, the addition of the extra channels avoids the lossy nature of the encoding process and facilitates the preservation of more information (e.g., feature details) about the original image 300.

The decoder 384 includes multiple decoder layers 384 a-d. In FIG. 3C, each decoder layer 384 a-d may be an unpacking layer for upsampling features during the decoding process. That is, each decoder layer 384 a-d may unpack a received feature map. Skip connections 386 transmit activations and gradients between encoder layers 382 a-d and decoder layers 384 a-d. The skip connections 386 facilitate resolving higher resolution details. For example, a gradient may be directly back-propagated to layers via the skip connections 386, thereby improving training. Additionally, the skip connections 386 directly transmit image details (e.g., features) from convolutional layers to deconvolutional layers, thereby improving image recovery at higher resolutions.

Various aspects of the present disclosure are directed using a shared architecture for a dialable perception task. In some examples, the perception task includes generating a dense LiDAR representation from data obtained via one or more sensors. Additionally, the dense LiDAR representation may be used for one or more vision tasks, such as 3D object detection. A 3D bounding box may be used to localize an object in an environment based on the dense LiDAR representation.

The shared architecture may reduce a size of the hypothesis space while at the same time lowering computational overhead. In some aspects, by using the shared architecture, a size of a model may increase without overfitting or slowing inference. The dialable perception task is an example of a plug-and-play task. That is, a dialable perception task may flexibly dial up or down perception functions, such as depth completion and depth prediction, depending on available sensors, sensor failures, dropped packets, and/or other sources of variation.

Figure 4:
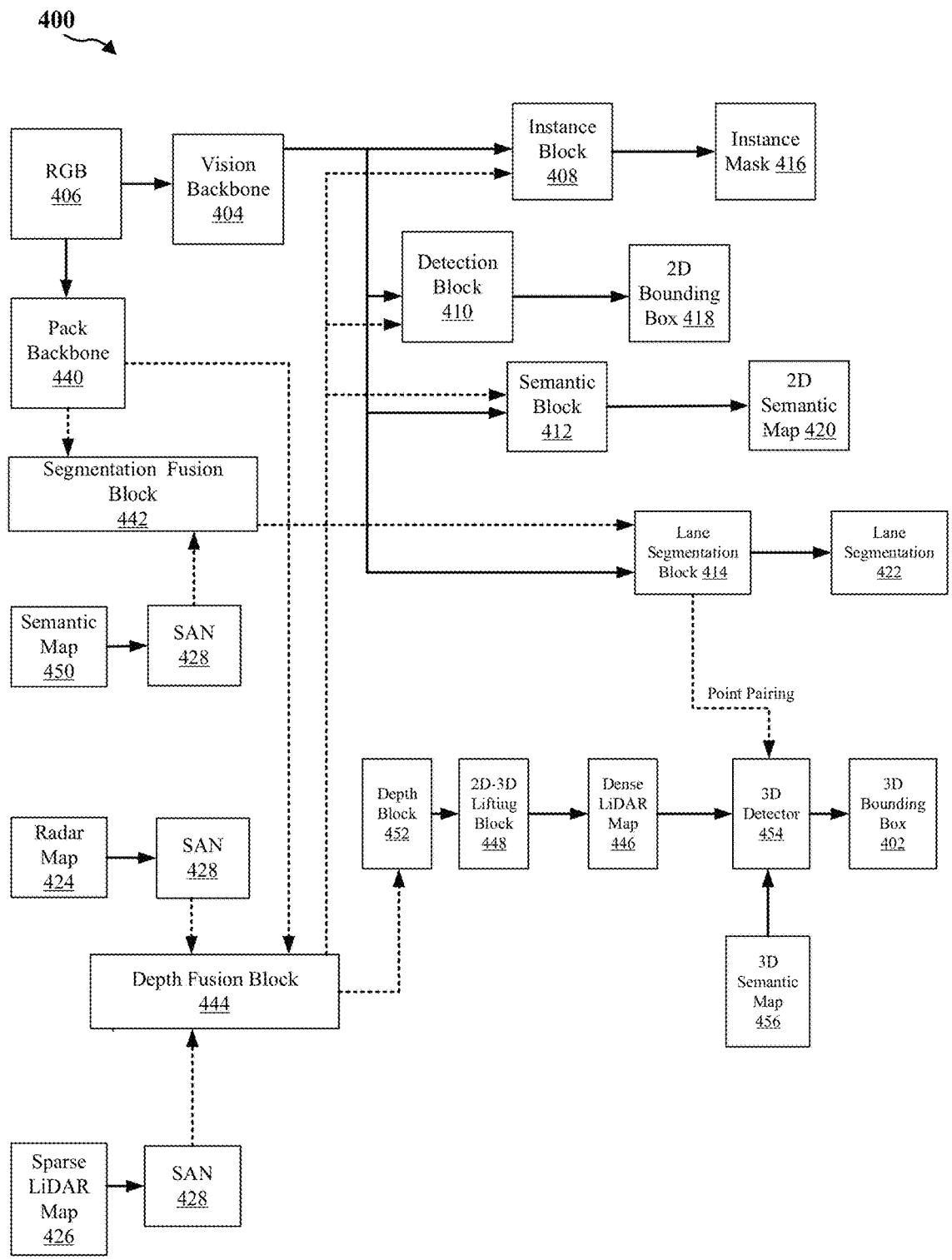
FIG. 4 is a block diagram illustrating an example of a dialable perception network, in accordance with various aspects of the present disclosure.

FIG. 4 is a block diagram illustrating an example of a dialable perception network 400, in accordance with various aspects of the present disclosure. In the example of FIG. 4, the dialable perception network 400 may be specified to generate a dense LiDAR representation 446 based on data obtained from a first-priority sensor and an output of one or more dialable sensors. The dense LiDAR representation 446 may be used for a vision task, such as 4D object detection, where a 4D bounding box 402 is used to identify a location of an object detected in the dense LiDAR representation 446. The dense LiDAR representation 446 may also be referred to as a dense LiDAR map or a dense LiDAR point cloud.

The dialable perception network 400 may be a component of a vision system that is integrated with a vehicle, such as the vehicle 100 described with reference to FIGS. 1A and 1B. Various aspects of the present disclosure may be applied in applications other than vehicular applications, such as robotic applications, surveillance applications, visually-impaired assistance applications, and any other application wherein object detection and/or a vision system is used.

As shown in FIG. 4, the dialable perception network 400 includes a main pipeline associated with a first-priority sensor. In this example, the vision backbone 404 is an example of the main pipeline and a camera, such as an RGB camera (not shown in FIG. 4), is an example of the first-priority sensor. The vision backbone 404 may also be referred to as a feature extraction network. The RGB camera may be an example of the 2D camera 108 described with reference to FIG. 1A. For ease of explanation, an RGB camera will be used as an example of the sensor that generates the RGB image 406. Still, other types of cameras (e.g., sensors) may be used to generate the RGB image 406. The vision backbone 404 may be a vision network, such as ResNet or KoiNet.

As shown in FIG. 4, an output of the vision backbone 404 may be processed by one or more task specific blocks, such as an instance block 408, a detection block 410, a semantic block 412, or a lane segmentation block 414. As discussed, the vision backbone 404 may output features associated with the RGB image 406. As shown in FIG. 4, the instance block 408 may generate an instance mask 416 of the RGB image 406, the detection block 410 may identify a location of an object in the RGB image and may generate a 2D bounding box 418 around the location of the object in the RGB image 406, the semantic block 412 may generate a 2D semantic map 420 of the RGB image 406, and the lane segmentation block 414 may generate a lane segmentation map 422 based on the RGB image 406. The 2D semantic map 420 may be generated by projecting the semantic information of the semantic block 412 to a 2D map of an environment. The vision backbone 404, instance block 408, detection block 410, semantic block 412, and lane segmentation block 414 may be individual machine learning models (e.g., artificial neural networks) or one or more components of a machine learning model.

In the example of FIG. 4, when one or more sensors are available in addition to the RGB camera, the RGB image 406 may be fused with an output 424, 426, or 444 of the one or more other sensors to generate the dense LiDAR representation 446. As shown in the example of FIG. 4, the one or more other sensors may generate a semantic map 450, a radar map 424, or a sparse LiDAR map 426. The semantic map 450 may The semantic map 450 may be a 2D semantic map generated by a vision sensor, such as the RGB camera. In some examples, the semantic map 450 is a birds-eye-view map projected onto image coordinates. A sonar map may be an example of the radar map 424. The radar map 424 may be generated based on information obtained from one or more of a radar sensor or a sonar sensor. The sparse LiDAR map 426 may be generated based on information obtained from a LiDAR sensor. The depth may be estimated via stereo matching, structure from motion, a monocular depth network, or one or more other techniques for estimating depth from an image. The semantic navigation map 450, radar map 424, and sparse LiDAR map 426 may be examples of sparse maps (e.g., sparse inputs). The radar map 424 may also be referred to as a sparse radar map.

The sparse maps 424, 426, 450 may also be referred to as sparse measurements or sparse inputs. In some examples, the depth measurements may be sparse due to limited sensing scope, interference, and/or economic considerations. As an example, some LiDAR sensors may provide sparse measurements with limited vertical resolutions and limited angular resolutions. However, visual tasks, such as 4D object detection, may specify a need for dense depth maps, such as a dense LiDAR map 446. Therefore, depth completion functions may be used to bridge a gap between sparse maps and dense maps.

In the example of FIG. 4, the dialable perception task may flexibly dial up or down perception functions, such as depth completion, based on the availability of the sparse maps 424, 426, 450. As discussed, one or more depth maps 424, 426, 450 may be used in conjunction with the RGB image 406 to perform the depth completion task (e.g., generate the dense LiDAR map 446). An accuracy of the dense LiDAR map 446 may improve as more sparse maps 424, 426, 450 become available.

As shown in the example of FIG. 4, the semantic map 450, radar map 424, and sparse LiDAR map 426 may be received at a sparse auxillary network (SAN) 428. The same SAN 428 may be used for each of the semantic map 450, radar map 424, and sparse LiDAR map 426. Alternatively, each of the semantic map 450, radar map 424, and sparse LiDAR map 426 may be received at a different SAN 428. The SAN 428 may be a sparse depth convolutional encoder.

Furthermore, as shown in FIG. 4, when one or more sensors are available in addition to the RGB camera, the RGB image 406 may be received at a pack backbone 440. The output of the pack backbone 440 may be received at a segmentation fusion block 442 or a depth fusion block 444 based on a desired task and/or an availability of sensors. An image, such as the RGB image 406, may be an example of a dense 2D representation of the information captured by a camera. Therefore, a convolutional network may be used to process the image for a computer vision task. In contrast, depth maps are sparse because, in most cases, less than 1% of the pixels of a depth map are valid pixels with useful information. Therefore, convolutions may be sub-optimal for depth maps because computational may be wasted on uninformative areas. Additionally, spatial dependencies may include spurious information from these uninformative areas. Finally, shared filters may average loss gradients from the entire input depth map. Thus, in some examples, a sparse convolutional network, such as an SAN 428, may process sparse sensor maps, such as the semantic map 450, the radar map 424, and the sparse LiDAR map 426. Fur In some examples, the segmentation fusion block 442 receives the output of one or more SANs 428, based on the availability of sensor data corresponding to a respective sparse map 424, 426, 450, and the output of the pack backbone 440. In some examples, the pack backbone 440 may be an example of an encoder-decoder depth prediction network. In some examples, the pack backbone 440 includes skip connections connecting each encoder layer to a respective decoder layer. The pack backbone 440 may fuse the sparse encoding.

In some examples, when generating the lane segmentation map 422, the output of the pack backbone 440 and an output of the SAN 428 may be received at the segmentation fusion block 442. In some other examples, the SAN 428 receives the semantic map 450. The output of the segmentation fusion block 442 may be received at the lane segmentation block 414. In this example, the lane segmentation block 414 also receives the features of the RGB image 406 generated by the vision backbone 404. The lane segmentation block 414 may then generate a lane segmentation map 422. In some examples, an accuracy of the lane segmentation map 422 generated by the lane segmentation block 414 may be improved when the lane segmentation block 414 receives both the output of the vision backbone 404 and the output of the segmentation fusion block 442. That is, the accuracy of the lane segmentation map 422 may be greater when the outputs of the segmentation fusion block 442 and the vision backbone 404 are used to generate the lane segmentation map 422, as opposed to when only the output of the vision backbone 404 is used to generate the lane segmentation map 422.

In some other examples, a depth fusion block 444 may receive an output of the SAN 428 associated with the radar map 424 and/or the sparse LiDAR map 426. In such examples, the depth fusion block 444 may also receive the output of the pack backbone 440. As shown in the example of FIG. 4, an output of the depth fusion block 444 may be received at one or more of the instance block 408, the detection block 410, the semantic block 412, or the depth block 452. For the instance block 408, the detection block 410, and the semantic block 412, the output of the depth fusion block 444 may supplement the output of the vision backbone 404 to improve an accuracy of an output of the respective blocks 408, 410, 412. In some other examples, the output of the depth fusion block 444 may be received at the depth block 452 to generate a dense LiDAR map 446. The depth block 452 may be an example of a depth decoder that decodes a depth estimate generate by the depth fusion block 444. The output of the depth block 452 may be received at a 2D-3D lifting block 448 which then generates the dense LiDAR map 446. The fusion blocks 442, 444 may combine different features. Each fusion block 442, 444 may be a multi-layer perception, a concatenator, or another type of fusion model. The depth block 452 is a decoder for a depth output. Once the depth block 452 outputs the depth, which is in 2-D image coordinate, the image may be inferred to a 3D space, according to depth information, via the 2D-3D lifting block 448.

As shown in the example of FIG. 4, the dense LiDAR map 446 may be received at a 3D detector 454. The 3D detector 454 may also receive a 3D semantic segmentation map 456 and a point pairing from the semantic segmentation map 420. The 3D semantic segmentation map 456 and the point pairing from the 2D semantic segmentation map 420 may be used to fuse BEV embeddings from the 3D semantic segmentation map 456 and/or the point pairings of the 2D semantic segmentation map 420 with the dense LiDAR map 446 to further improve the detection of the 3D objects. As shown in FIG. 4, the 3D detector 454 may generate a 3D bounding box 402 around one or more objects detected in the dense LiDAR map 446.

In conventional systems where tasks are shared, new models may be specified to use an existing backbone. According to some aspects of the present disclosure, rather than using a new model, an existing model may be used for a new task. In some examples, a reference dataset may be defined and an existing model with a frozen backbone may be trained on the reference dataset.

Figure 5A:
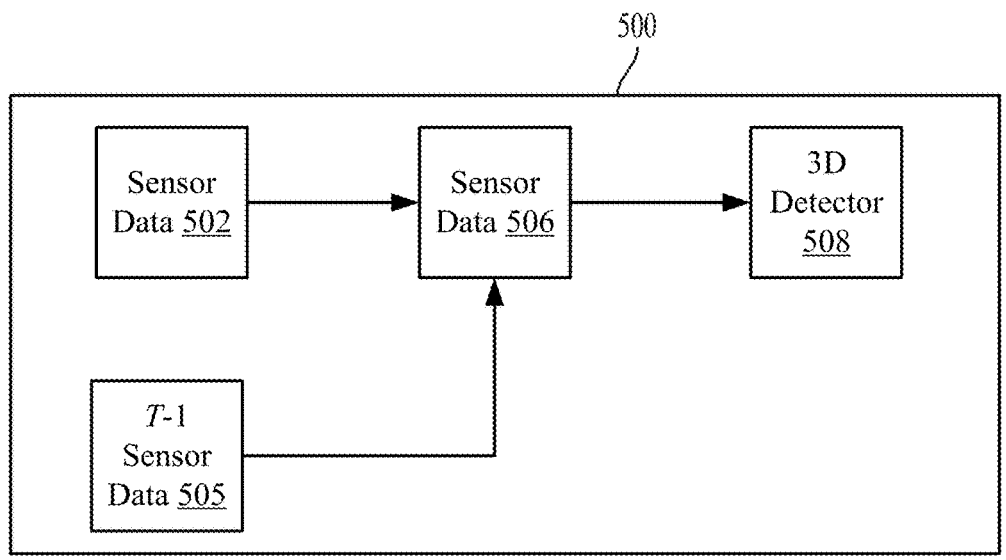
FIGS. 5A and 5B are examples of a shared backbone, in accordance with various aspects of the present disclosure.

A parked car classifier may be an example of a new task for an existing model. In some examples, the parked car classifier may use a shared backbone of an existing model. FIG. 5A is an example of a shared backbone 500, in accordance with various aspects of the present disclosure. As shown in the example of FIG. 5A, the shared backbone 500 may receive sensor data 502 from one or more sensors (not shown in FIG. 5A). The one or more sensors may include, for example, a camera, a LiDAR sensor, or a radar sensor, such that the sensor data 502 may include an image, a LiDAR map, a radar map, and/or another type of sensor data. The sensor data 502 may be associated with a scene at a current time (T). The shared backbone 500 may also receive sensor data 505 associated with the scene at a previous time (T−1). The current sensor data 502 and the previous sensor data 505 may be received at a scene representation model 506 to determine one or more features associated with the scene, such as optical flow and/or instance detection. The scene representation model 506 may output the scene information to a 3D detector 508 that may detect one or more 3D objects in the current scene.

Figure 5B:
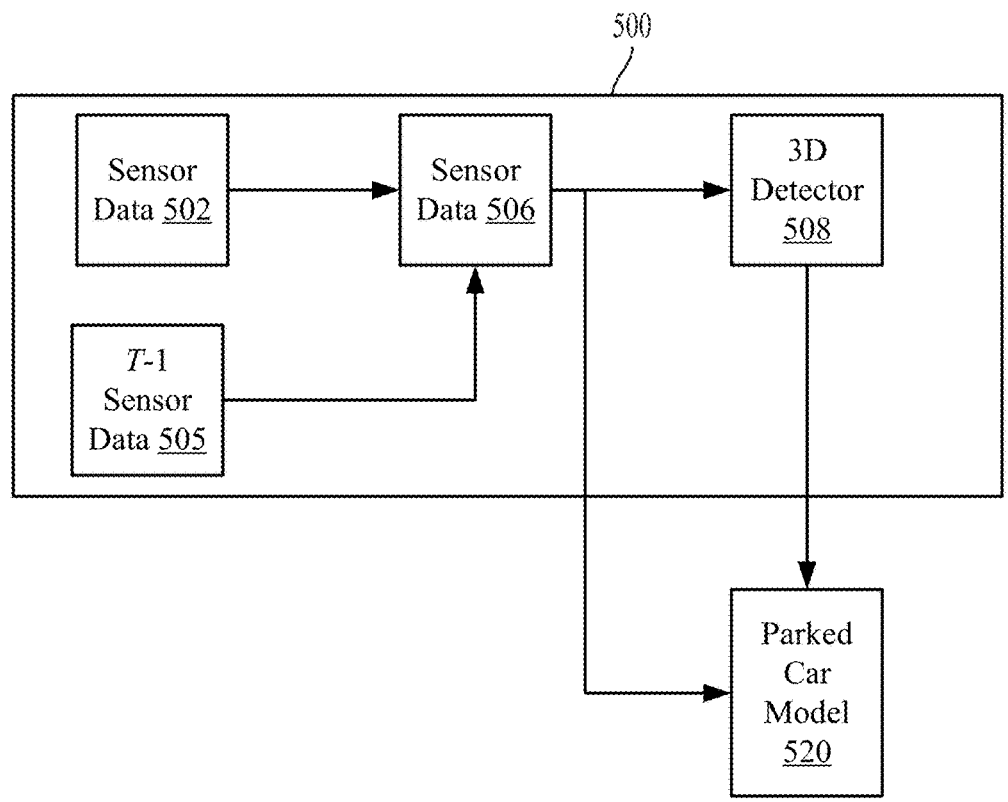

In some examples, the shared backbone 500 may be used in a model for detecting a parked car. FIG. 5B is a block diagram illustrating an example of the shared backbone 500, in accordance with various aspects of the present disclosure. As shown in the example of FIG. 5B, a parked car model 520 may be integrated with the shared backbone 500 described with reference to FIG. 5A. In this example, the parked car model 520 receives the output of the 3D detector 508 and the scene representation model 506. Based on the information received from the 3D detector 508 and the scene representation model 506, the parked car model 520 may label each vehicle in a scene as being parked or not parked.

In some examples, based on the defined shared backbone 500, a dataset may be generated for the parked car model 520. The dataset may be used to generate the park car label for each car. In some such examples, a loss and a training step may be defined. Furthermore, the park car model 520 that is integrated with the shared backbone 500 may be trained based on the loss and the data set. After training and optimization, the shared backbone 500 with the park car model 520 may be deployed in a vehicle, such as the vehicle 100 described with reference to FIGS. 1A and 1B, to identify parked vehicles.

Figure 6:
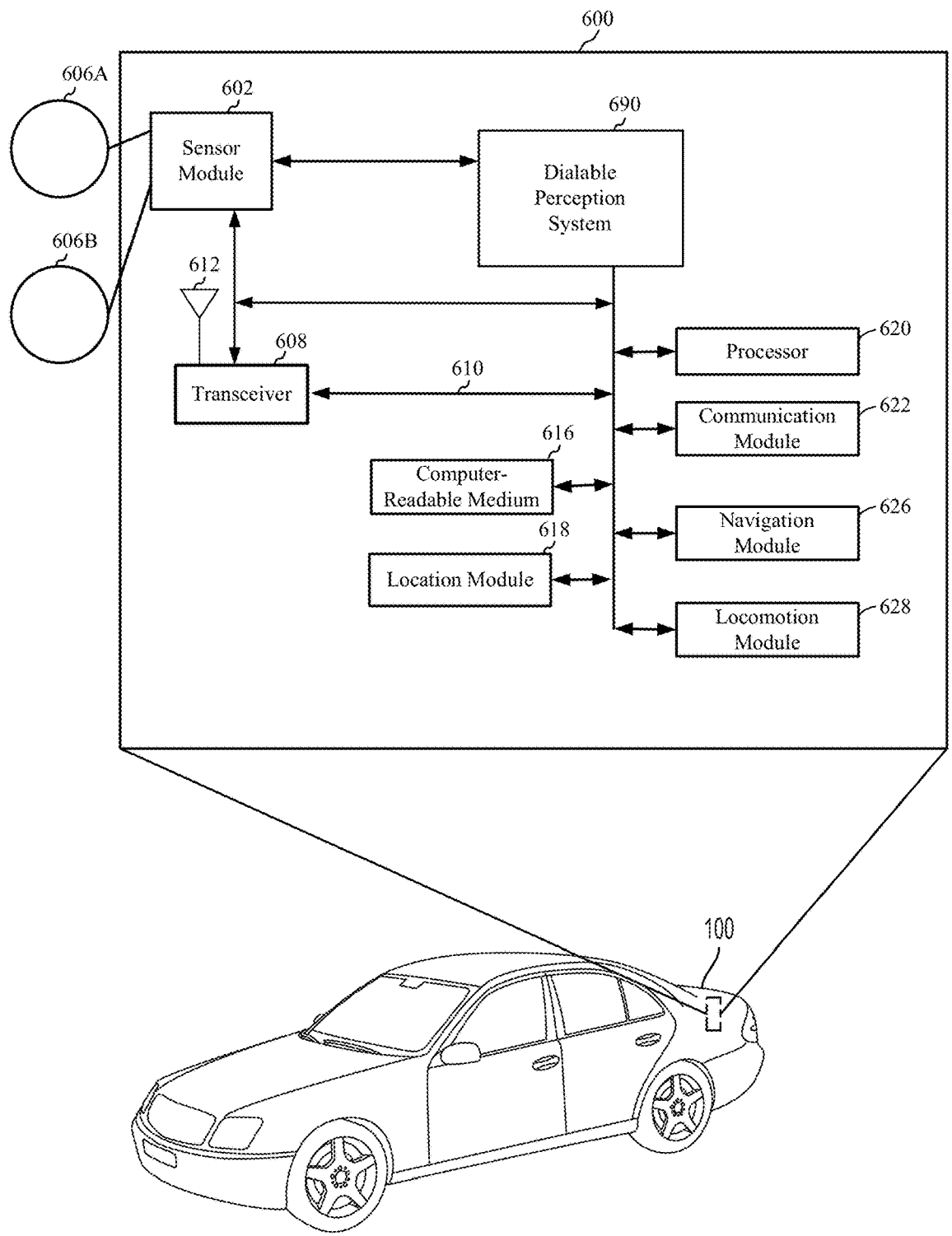
FIG. 6 is a diagram illustrating an example of a hardware implementation for a vehicle control system comprising a dialable perception system, in accordance with aspects of the present disclosure.

FIG. 6 is a diagram illustrating an example of a hardware implementation for a vehicle control system 600, according to aspects of the present disclosure. The vehicle control system 600 may be a component of a vehicle, a robotic device, or other device. For example, as shown in FIG. 6, the vehicle control system 600 is a component of a vehicle 100. Aspects of the present disclosure are not limited to the vehicle control system 600 being a component of the vehicle 100, as other devices, such as a bus, boat, drone, or robot, are also contemplated for using the vehicle control system 600. In the example of FIG. 6, the vehicle system may include an dialable perception system 690. In some examples, dialable perception system 690 is configured to perform operations, including operations of the process 700 described with reference to FIG. 7.

The vehicle control system 600 may be implemented with a bus architecture, represented generally by a bus 660. The bus 660 may include any number of interconnecting buses and bridges depending on the specific application of the vehicle control system 600 and the overall design constraints. The bus 660 links together various circuits including one or more processors and/or hardware modules, represented by a processor 620, a communication module 622, a location module 618, a sensor module 602, a locomotion module 628, a planning module 626, and a computer-readable medium 616. The bus 660 may also link various other circuits such as timing sources, peripherals, voltage regulators, and power management circuits, which are well known in the art, and therefore, will not be described any further.

The vehicle control system 600 includes a transceiver 608 coupled to the processor 620, the sensor module 602, the communication module 622, the location module 618, the locomotion module 628, the planning module 626, and the computer-readable medium 616. The transceiver 608 is coupled to an antenna 612. The transceiver 608 communicates with various other devices over a transmission medium. For example, the transceiver 608 may receive commands via transmissions from a user or a remote device. As another example, the transceiver 608 may transmit driving statistics and information from the comfort module 608 to a server (not shown).

In one or more arrangements, one or more of the modules 602, 608, 616, 618, 620, 622, 626, 628, 690, can include artificial or computational intelligence elements, such as, neural network, fuzzy logic or other machine learning algorithms. Further, in one or more arrangements, one or more of the modules 602, 608, 616, 618, 620, 622, 626, 628, 690 can be distributed among multiple modules 602, 608, 616, 618, 620, 622, 626, 628, 690 described herein. In one or more arrangements, two or more of the modules 602, 608, 616, 618, 620, 622, 626, 628, 690 of the vehicle control system 600 can be combined into a single module.

The vehicle control system 600 includes the processor 620 coupled to the computer-readable medium 616. The processor 620 performs processing, including the execution of software stored on the computer-readable medium 616 providing functionality according to the disclosure. The software, when executed by the processor 620, causes the vehicle control system 600 to perform the various functions described for a particular device, such as the vehicle 628, or any of the modules 602, 608, 616, 618, 620, 622, 626, 628, 690. The computer-readable medium 616 may also be used for storing data that is manipulated by the processor 620 when executing the software.

The sensor module 602 may be used to obtain measurements via different sensors, such as a first sensor 606A and a second sensor 606B. The first sensor 606A and/or the second sensor 606B may be a vision sensor, such as a stereoscopic camera or a red-green-blue (RGB) camera, for capturing 2D images. In some examples, one or both of the first sensor 606A or the second sensor 606B may be used to identify an intersection, a crosswalk, or another stopping location. Additionally, or alternatively, one or both of the first sensor 606A or the second sensor 606B may identify objects within a range of the vehicle 100. In some examples, one or both of the first sensor 606A or the second sensor 606B may identify a pedestrian or another object in a crosswalk, such as the crosswalk 202 described with reference to FIG. 2. The first sensor 606A and the second sensor 606B are not limited to vision sensors as other types of sensors, such as, for example, light detection and ranging (LiDAR), a radio detection and ranging (radar), sonar, and/or lasers are also contemplated for either of the sensors 606A, 606B. The measurements of the first sensor 606A and the second sensor 606B may be processed by one or more of the processor 620, the sensor module 602, the comfort module 608, the communication module 622, the location module 618, the locomotion module 628, the planning module 626, in conjunction with the computer-readable medium 616 to implement the functionality described herein. In one configuration, the data captured by the first sensor 606A and the second sensor 606B may be transmitted to an external device via the transceiver 608. The first sensor 606A and the second sensor 606B may be coupled to the vehicle 628 or may be in communication with the vehicle 628.

Additionally, the sensor module 602 may configure the processor 620 to obtain or receive information from the one or more sensors 606A and 606B. The information may be in the form of one or more two-dimensional image(s) and may be stored in the computer-readable medium 616 as sensor data. In the case a two-dimensional images, the two-dimensional image is, for example, an image from the one or more sensors 606A and 606B that encompasses a field-of-view about the vehicle 100 of at least a portion of the surrounding environment, sometimes referred to as a scene. That is, the image is, in one approach, generally limited to a subregion of the surrounding environment. As such, the image may be of a forward-facing (e.g., the direction of travel) 60, 90, 120-degree Field-of-view (FOV), a rear/side facing FOV, or some other subregion as defined by the characteristics of the one or more sensors 606A and 606B. In further aspects, the one or more sensors 606A and 606B may be an array of two or more cameras that capture multiple images of the surrounding environment and stitch the images together to form a comprehensive 360-degree view of the surrounding environment. In other examples, the one or more images may be paired stereoscopic images captured from the one or more sensors 606A and 606B having stereoscopic capabilities.

The location module 618 may be used to determine a location of the vehicle 628. For example, the location module 618 may use a global positioning system (GPS) to determine the location of the vehicle 628. The communication module 622 may be used to facilitate communications via the transceiver 608. For example, the communication module 622 may be configured to provide communication capabilities via different wireless protocols, such as WiFi, long term evolution (LTE), 6G, etc. The communication module 622 may also be used to communicate with other components of the vehicle 628 that are not modules of the vehicle control system 600. Additionally, or alternatively, the communication module 622 may be used to communicate with an occupant of the vehicle 100. Such communications may be facilitated via audio feedback from an audio system of the vehicle 100, visual feedback via a visual feedback system of the vehicle, and/or haptic feedback via a haptic feedback system of the vehicle.

The locomotion module 628 may be used to facilitate locomotion of the vehicle 628. As an example, the locomotion module 628 may control movement of the wheels. As another example, the locomotion module 628 may be in communication with a power source of the vehicle 628, such as an engine or batteries. Of course, aspects of the present disclosure are not limited to providing locomotion via wheels and are contemplated for other types of components for providing locomotion, such as propellers, treads, fins, and/or jet engines.

The vehicle control system 600 also includes the planning module 626 for planning a route or controlling the locomotion of the vehicle 628, via the locomotion module 628. A route may be planned to a passenger based on compartment data provided via the comfort module 608. In one configuration, the planning module 626 overrides the user input when the user input is expected (e.g., predicted) to cause a collision. The modules may be software modules running in the processor 620, resident/stored in the computer-readable medium 616, one or more hardware modules coupled to the processor 620, or some combination thereof.

The dialable perception system 690 may be in communication with the sensor module 602, the transceiver 608, the processor 620, the communication module 622, the location module 618, the locomotion module 628, the planning module 626, and the computer-readable medium 616. In some examples, the dialable perception system 690 may be implemented as a machine learning model, such as a dialable perception network 400 as described with reference to FIG. 4. Working in conjunction with one or more of the sensors 606A, 606B, the sensor module 602, and/or the other modules 608, 616, 618, 620, 622, 626, 628, 690. In some examples, the dialable perception system 690 may receive, at a sparse depth network, one or more sparse representations of an environment within a vicinity of the vehicle. Additionally, the dialable perception system 690, may generate, at a depth estimation network, a depth estimate of the environment depicted in an image captured by an image capturing sensor integrated with the vehicle based on receiving the one or more sparse representation. The dialable perception system 690 may also generate, via the sparse network, one or more sparse depth estimates based on receiving the one or more sparse representations of the environment, each sparse depth estimate associated with a respective sparse representation of the one or more sparse representations. Furthermore, the dialable perception system 690 may fuse, at a depth fusion network, the depth estimate and the one or more sparse depth estimates to generate a dense depth estimate.

Furthermore, the dialable perception system 690 may generate the dense LiDAR representation based on the dense depth estimate. Also, the dialable perception system 690 may control or adjust an action of the vehicle based on identifying a three-dimensional object in the dense LiDAR representation.

Figure 7:
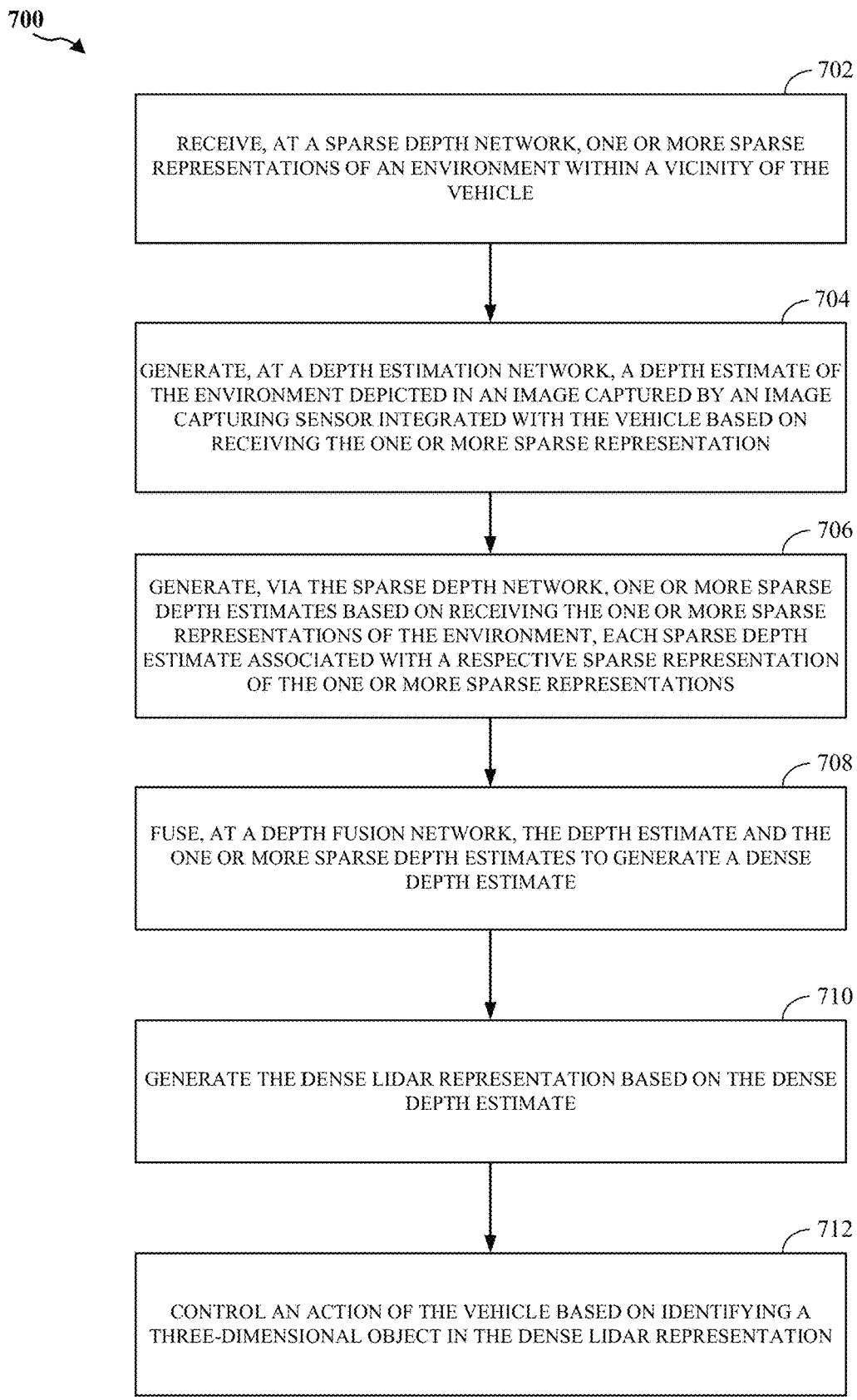
FIG. 7 illustrates a flow diagram for a process for adjusting an acceleration rate of a vehicle, in accordance with aspects of the present disclosure.

FIG. 7 illustrates a flow diagram for a process 700 for task-informed behavior planning, in accordance with aspects of the present disclosure. The vehicle may be an example of a vehicle 100 described with reference to FIGS. 1A, 1B, and 6. The process may be performed by a dialable perception network 400 as described with reference to FIG. 4 or a dialable perception system 690 as described with reference to FIG. 6. As shown in FIG. 7, the process 700 begins at block 702, by receiving, at a sparse depth network, one or more sparse representations of an environment within a vicinity of the vehicle. The SAN 428, as described with reference to FIG. 4, is an example of a sparse depth network. The radar map 424 and sparse LiDAR map 426, as described with reference to FIG. 4, are examples of sparse representations, each sparse representation may be generated by a respective sparse representation sensor of one or more sparse representation sensors integrated with the vehicle. The one or more sparse representations include one or more of a sparse LiDAR representation, a radar representation, or a semantic map. In some examples, the one or more sparse representation sensors include one or more of a sparse LiDAR sensor, a radar sensor, or another type of sensor.

In some examples (not shown in FIG. 7), the process 700 may also receive, at the sparse network, a semantic segmentation map. The process 700 may then generate, via the sparse network, a sparse depth estimate of the semantic segmentation map based on receiving the semantic segmentation map. The process 700 may also generate, at a segmentation fusion block (e.g., segmentation fusion block 442), a fused segmentation representation by fusing the depth estimate and the sparse semantic segmentation map. The process 700 may then generate generating, via a lane segmentation network, a lane segmentation map of the environment based on a combination of one or more features associated with the image and the one or more sparse depth estimates. The features may be generate via a feature extraction network, such as the vision backbone 404.

At block 704, the process 700 generates, at a depth estimation network, a depth estimate of the environment depicted in an image captured by an image capturing sensor integrated with the vehicle based on receiving the one or more sparse representation. The pack backbone 440 is an example of a depth estimation network. The RGB image 406 is an example of an image captured by an image capturing sensor integrated with the vehicle. In some examples, the process 700 may also generate, via a feature extraction network, features associated with the image. Additionally, the process 700 may perform one or more vision based tasks based on a combination of the features and the one or more sparse depth estimates. The one or more vision based tasks include, but are not limited to, one or more of generating an instance segmentation map of the environment, identifying a two-dimensional (2D) object in the environment, or generating a semantic segmentation map of the environment.

At block 706, the process 700 generates, via the sparse depth network, one or more sparse depth estimates based on receiving the one or more sparse representations of the environment, each sparse depth estimate associated with a respective sparse representation of the one or more sparse representations.

At block 708, the process 700 fuses, at a depth fusion network, the depth estimate and the one or more sparse depth estimates to generate a dense depth estimate. The depth fusion block 444, as described with reference to FIG. 4, is an example of a depth fusion network At block 710, the process 700 generates the dense LiDAR representation based on the dense depth estimate. The dense LiDAR map 446 is an example of a dense LiDAR representation. Generating the dense LiDAR representation may include decoding the depth estimate via a depth decoder and converting a 2D representation of the environment to a 3D space based on the decoded depth estimate. In such examples, the dense LiDAR representation is based on the 3D space. At block 712, the process 700 controls an action of the vehicle based on identifying a three-dimensional (3D) object in the dense LiDAR representation. The 3D object may be identified by a 3D bounding box 402. Controlling the action may include planning a route for the vehicle, increasing a speed of the vehicle, decreasing the speed of the vehicle, and/or performing another type of action associated with the vehicle.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing, and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a processor configured according to the present disclosure, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. The processor may be a microprocessor, controller, microcontroller, or state machine specially configured as described herein. A processor may also be implemented as a combination of computing devices, e.g., a combination of a DSP and a microprocessor, a plurality of microprocessors, one or more microprocessors in conjunction with a DSP core, or such other special configuration, as described herein.

The steps of a method or algorithm described in connection with the present disclosure may be embodied directly in hardware, in a software module executed by a processor, or in a combination of the two. A software module may reside in storage or machine readable medium, including random access memory (RAM), read only memory (ROM), flash memory, erasable programmable read-only memory (EPROM), electrically erasable programmable read-only memory (EEPROM), registers, a hard disk, a removable disk, a CD-ROM or other optical disk storage, magnetic disk storage or other magnetic storage devices, or any other medium that can be used to carry or store desired program code in the form of instructions or data structures and that can be accessed by a computer. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and processing, including the execution of software stored on the machine-readable media. Software shall be construed to mean instructions, data, or any combination thereof, whether referred to as software, firmware, middleware, microcode, hardware description language, or otherwise.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all of which may be accessed by the processor through the bus interface. Alternatively, or in addition, the machine-readable media, or any portion thereof, may be integrated into the processor, such as the case may be with cache and/or specialized register files. Although the various components discussed may be described as having a specific location, such as a local component, they may also be configured in various ways, such as certain components being configured as part of a distributed computing system.

The processing system may be configured with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functions described throughout this present disclosure. Those skilled in the art will recognize how best to implement the described functionality for the processing system depending on the particular application and the overall design constraints imposed on the overall system.

The machine-readable media may comprise a number of software modules. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a special purpose register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any storage medium that facilitates transfer of a computer program from one place to another. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means, such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes, and variations may be made in the arrangement, operation, and details of the methods and apparatus described above without departing from the scope of the claims.

What is claimed is:

1. A method for generating a dense light detection and ranging (LiDAR) representation by a vision system of a vehicle, comprising:
   receiving, at a sparse depth network, one or more sparse representations of an environment within a vicinity of the vehicle;
   generating, at a depth estimation network, a depth estimate of the environment depicted in an image captured by an image capturing sensor integrated with the vehicle based on receiving the one or more sparse representation;
   generating, via the sparse depth network, one or more sparse depth estimates based on receiving the one or more sparse representations of the environment, each sparse depth estimate associated with a respective sparse representation of the one or more sparse representations;
   fusing, at a depth fusion network, the depth estimate and the one or more sparse depth estimates to generate a dense depth estimate;

generating the dense LiDAR representation based on the dense depth estimate; and controlling an action of the vehicle based on identifying a three-dimensional object in the dense LiDAR representation.

2. The method of claim 1, further comprising:

generating, via a feature extraction network, features associated with the image; and performing one or more vision based tasks based on a combination of the features and the one or more sparse depth estimates.

3. The method of claim 2, wherein the one or more vision based tasks include one or more of generating an instance segmentation map of the environment, identifying a two-dimensional object in the environment, or generating a semantic segmentation map of the environment.

4. The method of claim 1, wherein:

generating the dense LiDAR representation comprises:
    decoding the depth estimate via a depth decoder; and
    converting a two-dimensional representation of the environment to a 3D space based on the decoded depth estimate; and the dense LiDAR representation is based on the 3D space.

5. The method of claim 1, further comprising:

receiving, at the sparse depth network, a semantic segmentation map;

generating, via the sparse depth network, a sparse depth estimate of the semantic segmentation map based on receiving the semantic segmentation map;

generating, at a segmentation fusion block, a fused segmentation representation by fusing the depth estimate and the sparse semantic segmentation map; and generating, via a lane segmentation network, a lane segmentation map of the environment based on a combination features associated with the image and the one or more sparse depth estimates, wherein the features are generated via a feature extraction network.

6. The method of claim 1, further comprising generating each sparse representation by a respective sparse representation sensor of one or more sparse representation sensors integrated with the vehicle.

7. The method of claim 6, wherein:

the one or more sparse representations include one or more of a sparse LiDAR representation or a radar representation; and the one or more sparse representation sensors include one or more of a sparse LiDAR sensor or a radar sensor.

8. An apparatus for generating a dense light detection and ranging (LiDAR) representation at a vision system of a vehicle, the apparatus comprising:

at least one processor; and at least one memory coupled with the at least one processor and storing instructions operable, when executed by the at least one processor, to cause the apparatus:

receive, at a sparse depth network, one or more sparse representations of an environment within a vicinity of the vehicle;

generate, at a depth estimation network, a depth estimate of the environment depicted in an image captured by an image capturing sensor integrated with the vehicle based on receiving the one or more sparse representation;

generate, via the sparse depth network, one or more sparse depth estimates based on receiving the one or more sparse representations of the environment, each sparse depth estimate associated with a respective sparse representation of the one or more sparse representations;

fuse, at a depth fusion network, the depth estimate and the one or more sparse depth estimates to generate a dense depth estimate;

generate the dense LiDAR representation based on the dense depth estimate; and control an action of the vehicle based on identifying a three-dimensional object in the dense LiDAR representation.

9. The apparatus of claim 8, wherein execution of the instructions further cause the apparatus to:

generate, via a feature extraction network, features associated with the image; and perform one or more vision based tasks based on a combination of the features and the one or more sparse depth estimates.

10. The apparatus of claim 9, wherein the one or more vision based tasks include one or more of generating an instance segmentation map of the environment, identifying a two-dimensional object in the environment, or generating a semantic segmentation map of the environment.

11. The apparatus of claim 8, wherein:

execution of the instructions that cause the apparatus to generate the dense LiDAR representation further cause the apparatus to:
    decode the depth estimate via a depth decoder; and
    convert a two-dimensional representation of the environment to a 3D space based on the decoded depth estimate; and the dense LiDAR representation is based on the 3D space.

12. The apparatus of claim 8, wherein execution of the instructions further cause the apparatus to:

receive, at the sparse depth network, a semantic segmentation map;

generate, via the sparse depth network, a sparse depth estimate of the semantic segmentation map based on receiving the semantic segmentation map;

generate, at a segmentation fusion block, a fused segmentation representation by fusing the depth estimate and the sparse semantic segmentation map; and generate, via a lane segmentation network, a lane segmentation map of the environment based on a combination features associated with the image and the one or more sparse depth estimates, wherein the features are generated via a feature extraction network.

13. The apparatus of claim 8, wherein execution of the instructions further cause the apparatus to generate each sparse representation by a respective sparse representation sensor of one or more sparse representation sensors integrated with the vehicle.

14. The apparatus of claim 13, wherein:

the one or more sparse representations include one or more of a sparse LiDAR representation or a radar representation; and the one or more sparse representation sensors include one or more of a sparse LiDAR sensor or a radar sensor.

15. A non-transitory computer-readable medium having program code recorded thereon for generating a dense light detection and ranging (LiDAR) representation at a vision system of a vehicle, the program code executed by a processor and comprising:

program code to receive, at a sparse depth network, one or more sparse representations of an environment within a vicinity of the vehicle;

program code to generate, at a depth estimation network, a depth estimate of the environment depicted in an image captured by an image capturing sensor integrated with the vehicle based on receiving the one or more sparse representation;

program code to generate, via the sparse depth network, one or more sparse depth estimates based on receiving the one or more sparse representations of the environment, each sparse depth estimate associated with a respective sparse representation of the one or more sparse representations;

program code to fuse, at a depth fusion network, the depth estimate and the one or more sparse depth estimates to generate a dense depth estimate;

program code to generate the dense LiDAR representation based on the dense depth estimate; and program code to control an action of the vehicle based on identifying a three-dimensional object in the dense LiDAR representation.

16. The non-transitory computer-readable medium of claim 15, wherein:
the program code further comprises program code to generate each sparse representation by a respective sparse representation sensor of one or more sparse representation sensors integrated with the vehicle;
the one or more sparse representations include one or more of a sparse LiDAR representation or a radar representation; and
the one or more sparse representation sensors include one or more of a sparse LiDAR sensor or a radar sensor.

17. The non-transitory computer-readable medium of claim 15, wherein the program code further comprises:
program code to generate, via a feature extraction network, features associated with the image; and
program code to perform one or more vision based tasks based on a combination of the features and the one or more sparse depth estimates.

18. The non-transitory computer-readable medium of claim 17, wherein the one or more vision based tasks include one or more of generating an instance segmentation map of the environment, identifying a two-dimensional object in the environment, or generating a semantic segmentation map of the environment.

19. The non-transitory computer-readable medium of claim 15, wherein:
the program code to generate the dense LiDAR representation comprises:
program code to decode the depth estimate via a depth decoder; and
program code to convert a 2D representation of the environment to a 3D space based on the decoded depth estimate; and
the dense LiDAR representation is based on the 3D space.

20. The non-transitory computer-readable medium of claim 15, wherein the program code further comprises:
program code to receive, at the sparse depth network, a semantic segmentation map;
program code to generate, via the sparse depth network, a sparse depth estimate of the semantic segmentation map based on receiving the semantic segmentation map;
program code to generate, at a segmentation fusion block, a fused segmentation representation by fusing the depth estimate and the sparse semantic segmentation map; and
program code to generate, via a lane segmentation network, a lane segmentation map of the environment based on a combination features associated with the image and the one or more sparse depth estimates,
wherein the features are generating via a feature extraction network.

* * * * *